United States Patent
Naidoo et al.

(10) Patent No.: US 12,282,535 B2
(45) Date of Patent: Apr. 22, 2025

(54) BLOCKCHAIN-BASED CERTIFICATE MANAGEMENT

(71) Applicant: DigiCert, Inc., Lehi, UT (US)

(72) Inventors: Shivan Naidoo, Cape Town (ZA); Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 202 days.

(21) Appl. No.: 18/343,103

(22) Filed: Jun. 28, 2023

(65) Prior Publication Data
US 2025/0005124 A1    Jan. 2, 2025

(51) Int. Cl.
*H04L 29/06*    (2006.01)
*G06F 21/33*    (2013.01)

(52) U.S. Cl.
CPC .................... *G06F 21/33* (2013.01)

(58) Field of Classification Search
None
See application file for complete search history.

(56) References Cited

U.S. PATENT DOCUMENTS

| | | | |
|---|---|---|---|
| 10,127,378 B2 * | 11/2018 | Toth | H04W 12/126 |
| 10,764,040 B2 | 9/2020 | Kumar et al. | |
| 10,904,241 B2 * | 1/2021 | Wei | H04L 63/0823 |
| 11,403,402 B2 | 8/2022 | Kumar et al. | |
| 12,244,696 B2 * | 3/2025 | Nix | H04L 9/0825 |
| 2008/0118065 A1 | 5/2008 | Blaisdell et al. | |
| 2009/0158282 A1 | 6/2009 | Blaisdell et al. | |
| 2013/0305228 A1 | 11/2013 | Black et al. | |
| 2016/0275461 A1 * | 9/2016 | Sprague | G06Q 20/3829 |
| 2018/0039667 A1 * | 2/2018 | Pierce | H04L 9/3247 |
| 2018/0048461 A1 * | 2/2018 | Jutla | H04L 9/3268 |
| 2018/0294977 A1 * | 10/2018 | Uhr | G06F 21/33 |
| 2019/0236286 A1 * | 8/2019 | Scriber | G06F 21/602 |
| 2019/0319809 A1 | 10/2019 | Rowley | |
| 2020/0067915 A1 | 2/2020 | Kumar et al. | |
| 2020/0358782 A1 * | 11/2020 | Hager | G06F 21/645 |
| 2020/0374129 A1 * | 11/2020 | Dilles | H04L 9/3273 |
| 2021/0044976 A1 * | 2/2021 | Avetisov | H04W 12/08 |
| 2021/0334363 A1 * | 10/2021 | Kim | G06F 21/54 |
| 2022/0094675 A1 * | 3/2022 | Madisetti | H04L 9/14 |

OTHER PUBLICATIONS

Kinkelin, Holger et al. Hardening X.509 Certificate Issuance using Distributed Ledger Technology. NOMS 2020—2020 IEEE/IFIP Network Operations and Management Symposium. https://ieeexplore.ieee.org/stamp/stamp.jsp?tp=&arnumber=9110311 (Year: 2020).*

(Continued)

*Primary Examiner* — Jeremiah L Avery
(74) *Attorney, Agent, or Firm* — Baratta Law PLLC; Lawrence A. Baratta, Jr.; Ryan Odessa

(57) ABSTRACT

Systems and methods for a blockchain-based OCSP responder using smart contracts and custom URI scheme for certificate revocation management. Various embodiments include, responsive to a requirement to determine status of a digital certificate, obtaining blockchain information from the digital certificate; interacting with a specified blockchain network based on the blockchain information; and determining a status of the digital certificate based on the Interacting.

20 Claims, 5 Drawing Sheets

(56) References Cited

OTHER PUBLICATIONS

Omar, Ahmad Sghaier; Basir, Otman. Identity Management in IoT Networks Using Blockchain and Smart Contracts. 2018 IEEE Confs on Internet of Things, Green Computing and Communications, Cyber, Physical and Social Computing and Smart Data. https://ieeexplore.ieee.org/stamp/stamp.jsp?tp=&arnumber=8726730 (Year: 2018).*

Zhou, Yue et al. Application of Distributed Ledger Technology in Distribution Networks. Proceedings of the IEEE, vol. 110, issue: 12. https://ieeexplore.ieee.org/stamp/stamp.jsp?tp=&arnumber=9805829 (Year: 2022).*

* cited by examiner

BLOCKCHAIN-BASED CERTIFICATE MANAGEMENT

FIELD OF THE DISCLOSURE

The present disclosure relates generally to networking and computing. More particularly, the present disclosure relates to systems and methods for blockchain-based certificate management.

BACKGROUND OF THE DISCLOSURE

Traditional Online Certificate Status Protocol (OCSP) responders are centralized servers that provide revocation information of digital certificates. Such centralized approaches have various drawbacks, such as single points of failure, reliance on the Certificate Authorities (CA's) infrastructure, and potential privacy concerns. The present disclosure provides systems and methods to solve these issues by utilizing a decentralized blockchain-based approach, leveraging smart contracts for OCSP response generation and certificate revocation management, and introducing a custom Uniform Resource Identifier (URI) scheme to facilitate client interaction with the smart contract.

BRIEF SUMMARY OF THE DISCLOSURE

The present disclosure relates to systems and methods for blockchain-based certificate management. More specifically, various embodiments provide a blockchain-based OCSP responder using smart contracts and a custom URI scheme for certificate revocation management.

In various embodiments, the present disclosure includes a method having steps, a processing device configured to implement the steps, a cloud service configured to implement the steps, and a non-transitory computer-readable medium storing instructions that, when executed, cause one or more processors to implement the steps. The steps include, responsive to a requirement to determine status of a digital certificate, obtaining blockchain information from the digital certificate; interacting with a specified blockchain network based on the blockchain information; and determining a status of the digital certificate based on the Interacting.

The steps further include wherein the blockchain information includes a Uniform Resource Identifier (URI) in an extension field of the digital certificate with the URI for the specified blockchain network. The URI in the extension field can be utilized in lieu of an Online Certificate Status Protocol (OSCP) URI. The blockchain information can include a smart contract address in the specified blockchain network. The blockchain information can include a method for requesting the digital certificate's status in the specified blockchain network. The status can be one of good, revoked, and unknown. The steps can further include, responsive to a Certificate Authority (CA) for the digital certificate revoking the digital certificate by adding a transaction to the specified blockchain network, determining the status of the digital certificate as revoked. Responsive to the status being revoked, the steps can include deleting the digital certificate. The steps can further include periodically querying the specified blockchain network for the digital certificate. The steps can include updating one or more additional IoT devices based on the status of the digital certificate, wherein the one or more additional IoT devices are connected to the IoT device and not connected to the Internet.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for blockchain-based certificate management. Specifically, the present disclosure includes, based on a requirement to determine a status of a digital certificate, obtaining blockchain information from the digital certificate, and determining a status of the digital certificate based on interacting with a specific blockchain network. That is, the various embodiments provide a blockchain-based OCSP responder using smart contracts and a custom URI scheme for certificate revocation management.

Enterprise Network

Figure 1:
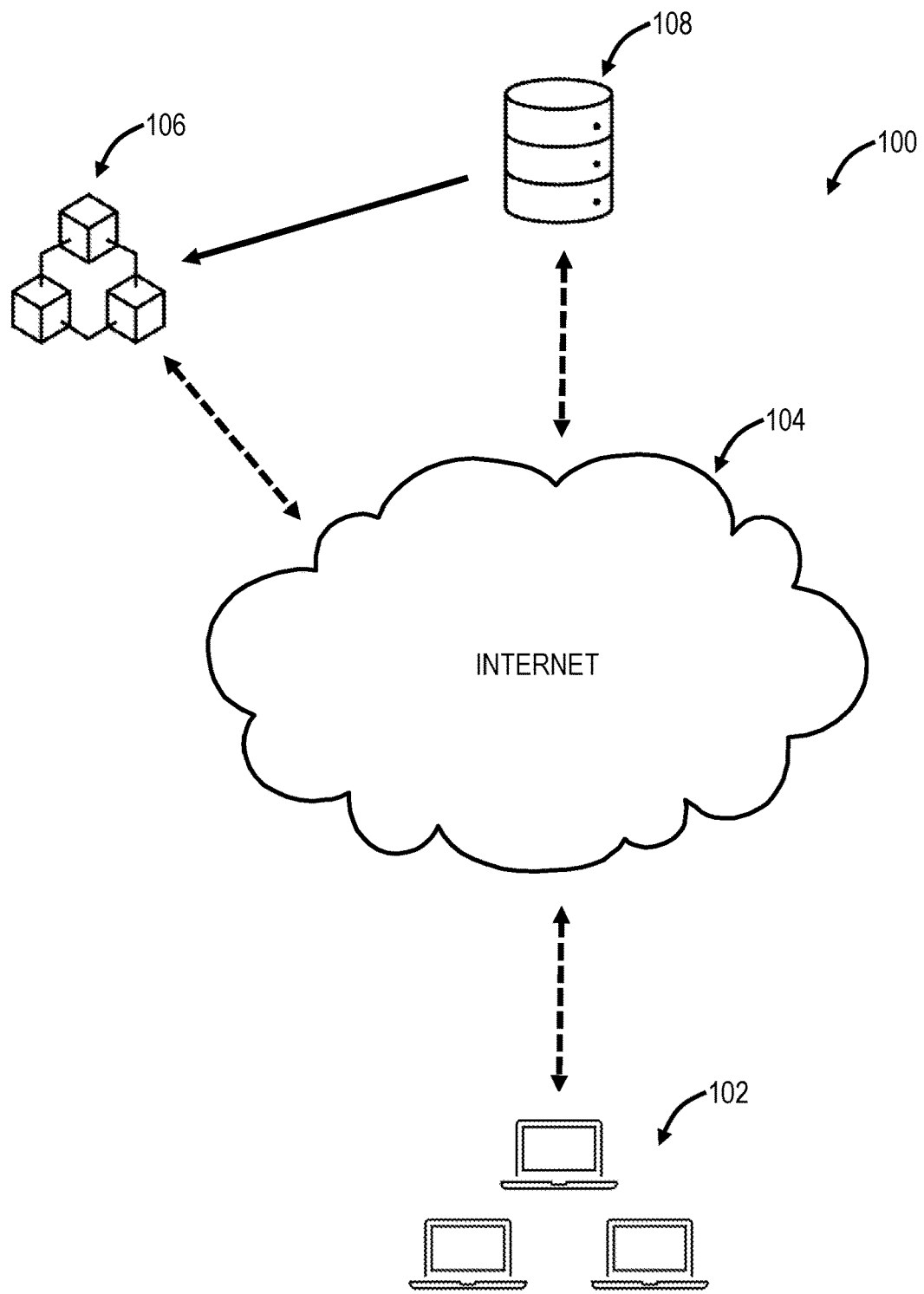
FIG. 1 is a network diagram of a network that includes enterprise networking resources, the Internet, a discovery service, and secure storage resources.

FIG. 1 is a network diagram of a network 100 that includes clients 102, the Internet 104, a blockchain 106, and a Certificate Authority (CA) 108. The network 100 is presented for illustration purposes and one skilled in the art will appreciate there can be various different deployments of the network 100, all of which are contemplated herewith. The clients 102 can include Local Area Network (LANs) with hosts (computers), file servers, Internet of Things (IoT) devices, and the like.

As shown, the CA 108 is adapted to modify the blockchain 106. That is, in an embodiment, the CA 108 can update the blockchain 106. For example, for blockchain-based certificate management, the CA 108 can be adapted to update the status of a digital certificate in the blockchain 106. With the use of smart contracts with the blockchain 106, the CA 108 can send a transaction to the corresponding smart contract on the blockchain 106, updating the certificate's status to "revoked."

The clients 102 are adapted to access the blockchain 106 for retrieving a status of one or more digital certificates. Various methods described herein return a current revocation status of a digital certificate, as well as a last updated timestamp when requested by the one or more clients 102. The clients 102 can call this method to retrieve an OCSP response. In various embodiments, the one or more clients 102 can be a plurality of Internet of Things (IoT) devices in an IoT network.

The present disclosure provides a system and method for managing digital certificate revocation using blockchain technology with smart contracts. The various embodiments can utilize a network flow such as the network 100 shown in FIG. 1 which allows clients to access the blockchain 106. The blockchain 106 of the present disclosure can include a plurality of smart contracts. By deploying a smart contract uniquely identified by a certificate serial number, the process for retrieving certificate revocation status is decentralized, enhancing the reliability, security, and privacy of the certificate revocation process.

Processing System

Figure 2:
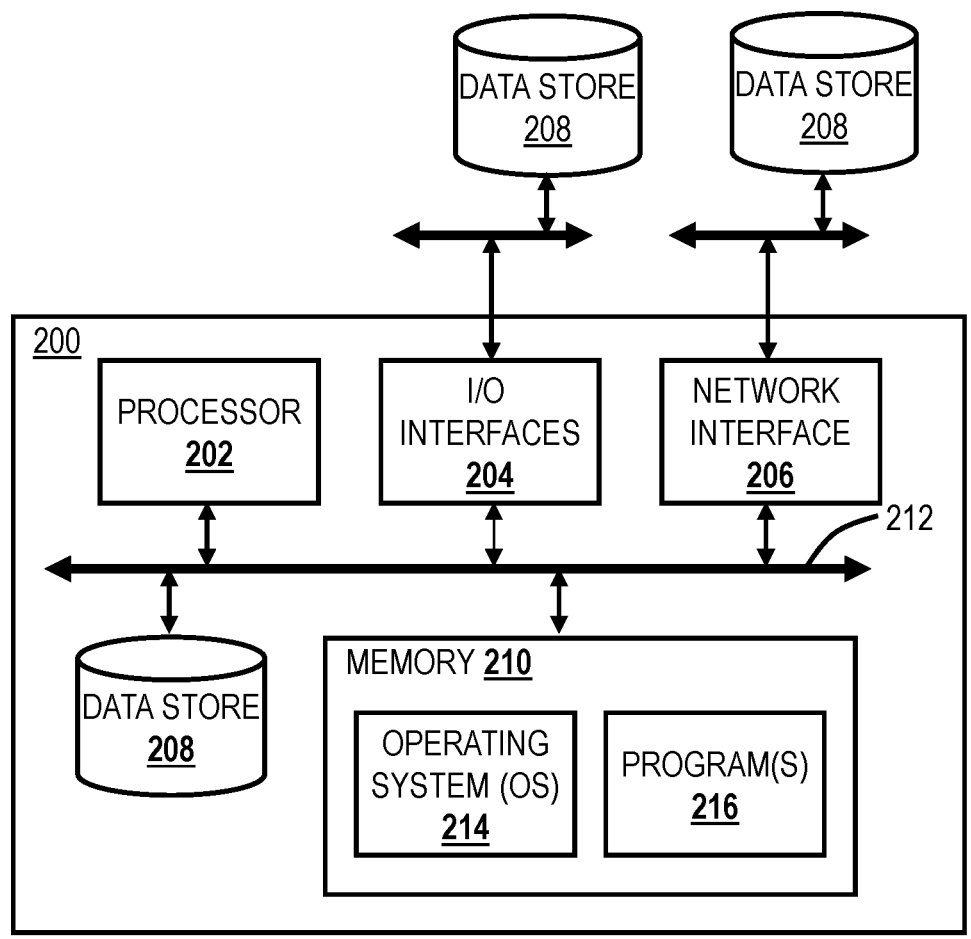
FIG. 2 is a block diagram of a processing system, which may represent a client device in the network of FIG. 1.

FIG. 2 is a block diagram of a processing system 200, which may represent a client 102. The processing system 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the processing system 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing system 200, a semiconductor-based microprocessor (in the form of a microchip or chipset), or generally any device for executing software instructions. When the processing system 200 is in operation, the processor 202 is configured to execute software stored within the memory 210, to communicate data to and from the memory 210, and to generally control operations of the processing system 200 pursuant to the software instructions. The I/O interfaces 204 may be used to receive user input from and/or for providing system output to one or more devices or components.

The network interface 206 may be used to enable the processing system 200 to communicate on a network, such as the Internet. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the processing system 200, such as, for example, an internal hard drive connected to the local interface 212 in the processing system 200. Additionally, in another embodiment, the data store 208 may be located external to the processing system 200 such as, for example, an external hard drive connected to the I/O interfaces 204 (e.g., SCSI or USB connection). In a further embodiment, the data store 208 may be connected to the processing system 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Of note, the general architecture of the processing system 200 can define any device in the network 100. However, the processing system 200 is merely presented as an example architecture for illustration purposes. Other physical embodiments are contemplated, including virtual machines (VM), software containers, appliances, network devices, cloud infrastructure, and the like.

Digital Certificate

Providing secure communication and protecting sensitive data is a well-known issue in a broad variety of contexts. For example, it is common for computer servers to use digital certificates to associate a server with a network domain. In such cases, clients use information contained in a certificate to verify the identity of a server and to establish a secure communication session with that server (e.g., an SSL or TLS session). More generally, digital certificates and Public Key Infrastructure (PKI) techniques are used to create, distribute, and manage cryptographic keys used in a variety of contexts. In other examples, digital certificates can be utilized to secure websites, devices, servers, signatures, code, etc.

Typically, part of establishing a secure communication session with a server or other device includes verifying that a certificate presented by the server or device is digitally signed by a "trusted" certificate authority. More specifically, digital certificates include a subject field that identifies the individual, server, device, etc. to which the certificate was issued (i.e., the entity associated with the public key listed the digital certificate). Digital certificates also include an issuer field identifying the certification authority (CA) certifying the identity of the subject. When a server presents a digital certificate, the client can verify whether the issuing CA signing that certificate is "trusted." The process of verifying the authenticity and validity of a newly received certificate involves checking all of the certificates in a chain of certificates from the certificate presented by a server, through any intermediate CAs, until reaching a certificate issued and signed by CA trusted by the client. A certificate presented to a client is trusted only if each certificate in that certificate's chain is properly issued and valid, i.e., the CA must identify the digital certificate as good (not revoked).

For example, a process for validating a digital certificate can include the use of Online certificate status protocol (OCSP). This is a method of delivering a status of a digital certificate to a relying party. When an OCSP request for a certificate is received, a certificate authority sends a digitally signed OCSP response to the relying party. Such a response indicates whether the certificate is valid or revoked. Once signed, an OCSP response is valid and correct for a specified period of time, e.g., seven days, or until the certificate is revoked.

Online Certificate Status Protocol (OCSP)

As stated, the present disclosure provides a blockchain-based OCSP responder for certificate revocation management. Online Certificate Status Protocol (OCSP) is an internet protocol that is used to obtain a revocation status of digital certificates. More specifically, to obtain revocation status of an X.509 digital certificate. Typically, communication via OCSP is encoded and communicated over Hypertext Transfer Protocol (HTTP), wherein a typical use case for OCSP is to validate Hypertext Transfer Protocol Secure (HTTPS) certificates.

A simplified flow for utilizing OCSP can include a CA issuing public key certificates to two parties. These parties can be any client device capable of utilizing a digital certificate such as a user device, an IoT device, etc. If the two parties wish to execute a transaction between them, an OCSP request can be created and sent to the CA for verifying that one or both of the digital certificates are not compromised. The OCSP request typically includes the certificate serial number of the digital certificate being verified. The CA's OCSP responder reads the certificate serial number and looks up the revocation status of the digital certificate in question. Traditionally, the OCSP responder looks in a CA database, which the CA maintains, for determining if the digital certificate in question has been compromised. Based on the revocation status of the digital certificate, the OCSP responder returns a signed response identifying the digital certificate as "good", "revoked", or "unknown".

Traditional OCSP responders are centralized servers that provide revocation information of digital certificates by utilizing CA maintained databases. These centralized approaches have various drawbacks, such as single points of failure due to reliance on the CA's infrastructure, and potential privacy concerns. These privacy concerns are introduced because it requires the client to contact a third party to confirm certificate validity.

Smart Contract

The use of smart contracts in blockchains can provide various benefits for efficiency and trust. By using smart contracts, the speed of transactions is greatly increased because once various conditions are met, the smart contract is executed immediately. Also, because no third party is involved in the transaction, and because encrypted records are shared among participants of the blockchain, there can be no question to whether the information is altered for a user's personal benefit. More specifically, because each record in a blockchain is connected to the previous record on the distributed ledger, a malicious actor would be required to alter the entire chain in order to change a single record.

Smart contracts are programs stored on a blockchain which are adapted to execute when certain conditions are met. Similar to a traditional contract, smart contracts are utilized to automate execution of agreements, allowing all participants to be instantaneously assured of the outcome without latency or third party involvement. In other use cases, smart contracts can be used to automate a workflow by triggering a next action based on the certain conditions being met, such is the use of smart contracts in the present disclosure.

Smart contracts follow simple "if/when . . . then . . . " statements that are written into the code on a blockchain. The actions defined by the statements are then executed when the predetermined conditions are met. Subsequently, the blockchain is updated when the transaction is completed, and only the parties who have been granted permission can see the results.

Blockchain-Based Certificate Management

Again, traditional OCSP responders are centralized servers that provide revocation information of digital certificates. These centralized approaches have various drawbacks, such as single points of failure, reliance on the CA's infrastructure, and potential privacy concerns. The present disclosure provides systems and methods to solve these issues by utilizing a decentralized blockchain-based approach, leveraging smart contracts for OCSP response generation and certificate revocation management, and introducing a custom URI scheme to facilitate client interaction with the smart contract.

Various embodiments include systems and methods for managing digital certificate revocation using blockchain technology, smart contracts, and a custom URI scheme. By deploying a smart contract uniquely identified by the certificate serial number and incorporating the smart contract address and status method call within the custom URI, the OCSP responder functionality is decentralized. These features enhance the reliability, security, and privacy of the certificate revocation process.

As described herein, a blockchain is a decentralized system, which means that it is not controlled by a single entity. This makes it more resilient to attacks and ensures that the status of a certificate can be checked even if the CA's servers are unavailable. Additionally, transactions on a blockchain are permanent and cannot be altered, which means that the revocation status of a certificate recorded on the blockchain cannot be tampered with. Further, a blockchain can process a large number of transactions in a short period of time, which means that the OCSP protocol could potentially be implemented more efficiently depending on the choice of blockchain technology.

In various embodiments, a CA is adapted to create a smart contract for each issued digital certificate. Upon issuing each of the digital certificates, the CA generates a unique identifier, such as the certificate serial number and the like. The CA creates a smart contract containing the certificates current status and associates it with the unique identifier. The CA can then deploy the smart contract to a blockchain network and record the smart contracts address.

In another embodiment, the CA includes the smart contract address and method call in the issued digital certificate using a custom URI scheme. The CA can create a custom URI following the format:

smartcontract://[blockchain_network]/[smart_contract_address]?method=[method_name]

[blockchain_network] represents the specific blockchain network, [smart_contract_address] represents the smart contract's address, and [method_name] represents the name of the smart contract method for determining the certificate status. The CA embeds the custom URI in the certificate's extension field, replacing the traditional OCSP responder URL.

A client can query the smart contract for certificate revocation status using the custom URI scheme. Upon receiving a digital certificate, the client extracts the custom URI from the certificate's extension field and parses the blockchain network, smart contract address, and method name. The client interacts with the smart contract on the specified blockchain network, invoking the specified method to request the certificate's revocation status. The smart contract returns the certificate's status (e.g., "good," "revoked," or "unknown") as an OCSP response.

The client can verify the authenticity of the OCSP response by checking the smart contract's integrity. The client processes the certificate's revocation status and proceeds with or terminates the secure connection accordingly. To revoke a certificate, the CA sends a transaction to the corresponding smart contract on the blockchain network, updating the certificate's status to "revoked."

Various smart contract data attributes can include the following:
Owner: The address of the Certificate Authority (CA) that created the smart contract, wherein the owner has permission to update the certificate's revocation status.
Serial Number: The unique identifier of the digital certificate, such as the certificate's serial number.
Status: The revocation status of the digital certificate.
Revocation Time: The timestamp of when the certificate was revoked (this attribute is set only if the status is "revoked").
Last Update: The timestamp of the last update to the smart contract, which is utilized for checking how new the certificate status information is.

Various methods can be utilized to return the current revocation status of a digital certificate, as well as the last updated timestamp. Clients can call such methods to retrieve the OCSP response. Additionally, methods can allow the CA (owner) to revoke the certificate by updating the status to "revoked" and setting the revocation time. This method can also update the last updated attribute.

Figure 3:
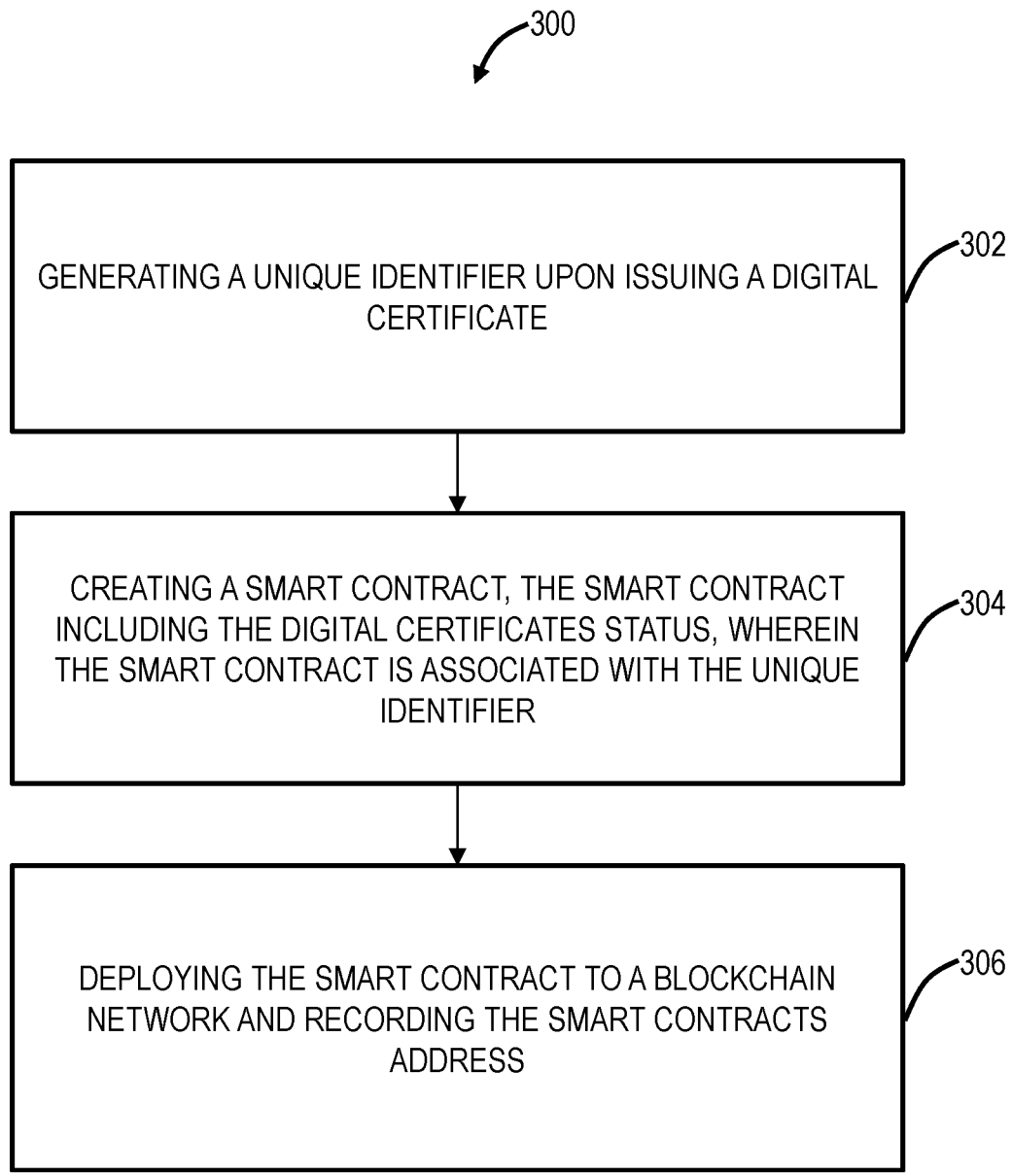
FIG. 3 is a flowchart of a process for creating a smart contract for a digital certificate.

FIG. 3 is a flowchart of a process 300 for creating a smart contract for a digital certificate. The process 300 includes, at a CA, generating a unique identifier (URI) upon issuing a digital certificate (step 302); creating a smart contract, the smart contract including the digital certificates status, wherein the smart contract is associated with the unique identifier (step 304); and deploying the smart contract to a blockchain network and recording the smart contracts address (step 306). In various embodiments, the unique identifier can be the certificate serial number.

As stated, the CA can include information relating to a specific blockchain network, the smart contract address, and a method call in a custom URI. The CA can then embed the custom URI in a certificate's extension field, thereby replacing the traditional OCSP responder URL.

Figure 4:
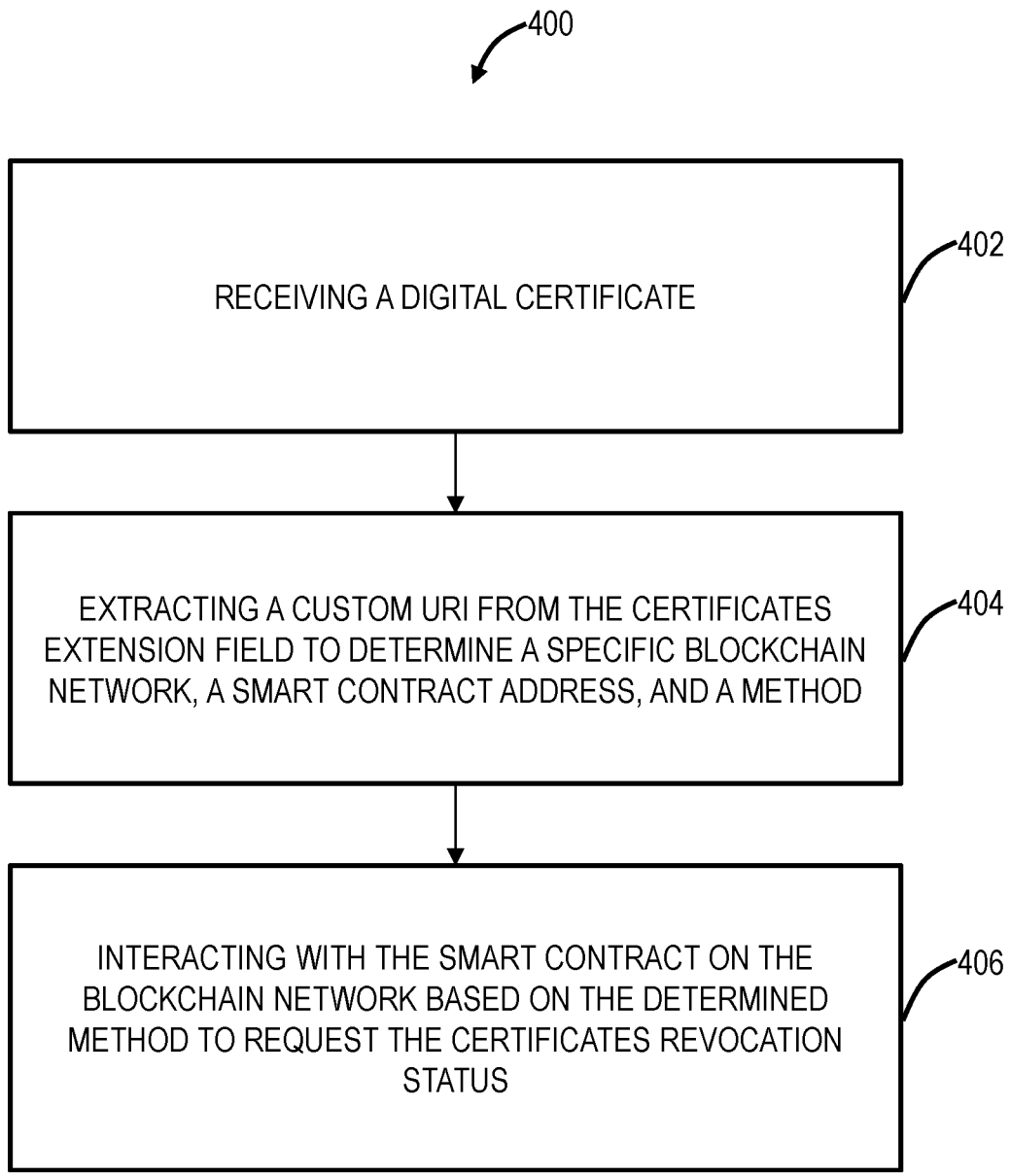
FIG. 4 is a flowchart of a process for retrieving a current revocation status of a digital certificate.

FIG. 4 is a flowchart of a process 400 for retrieving a current revocation status of a digital certificate. The process 400 includes, at the client device, receiving a digital certificate (step 402); extracting a custom URI from the certificates extension field to determine a specific blockchain network, a smart contract address, and a method (step 404); and interacting with the smart contract on the blockchain network based on the determined method to request the certificates revocation status (step 406). The smart contract is adapted to then return a revocation status associated with the certificate to the client as an OCSP response. Again, the client is adapted to verify the authenticity of the OCSP response by checking the smart contracts integrity.

Because of the inherent structure of blockchain networks, the integrity of the smart contract can be tested by causing a plurality of clients to run the same code and verify that their results match. It will be appreciated the other methods of verifying the integrity of smart contracts in blockchain networks known to one of skill in the art are also contemplated herein.

The present systems and methods can further be utilized for determining the certificate revocation status for Internet of Things (IoT) devices. For IoT device registration and authentication, the CA can authenticate the IoT devices during registration to ensure their legitimacy and prevent unauthorized devices from obtaining certificates. IoT devices must be registered with the CA to obtain a digital certificate and have their unique identifiers, such as serial numbers or Media Access Control (MAC) addresses, included in the certificate request.

To ensure compatibility for resource-constrained IoT devices, lightweight smart contracts are designed to minimize computational overhead and resource usage, enabling resource-constrained IoT devices to interact with the blockchain network efficiently. The smart contracts are adapted to support lightweight cryptographic mechanisms to reduce computational requirements for IoT devices.

To enable IoT device communication with blockchain networks, a protocol abstraction layer is provided to interact with the blockchain network and query the smart contracts for certificate revocation status. Protocol abstraction layers are adapted to support various IoT communication protocols, such as MQ Telemetry Transport (MQTT), Constrained Application Protocol (CoAP), or Hypertext Transfer Protocol (HTTP), to facilitate seamless integration with different IoT devices and networks.

Various embodiments of the present disclosure include an auto-update mechanism for IoT devices. In these embodiments, IoT devices have an auto-update mechanism to automatically query the smart contract for certificate revocation status at regular intervals or upon specific triggers, such as a change in network conditions or device status. The regular intervals can be preconfigured as to query the smart contract at desired intervals. The auto-update mechanism is configurable by the device owner or administrator, allowing them to define the update frequency and triggers.

Figure 5:
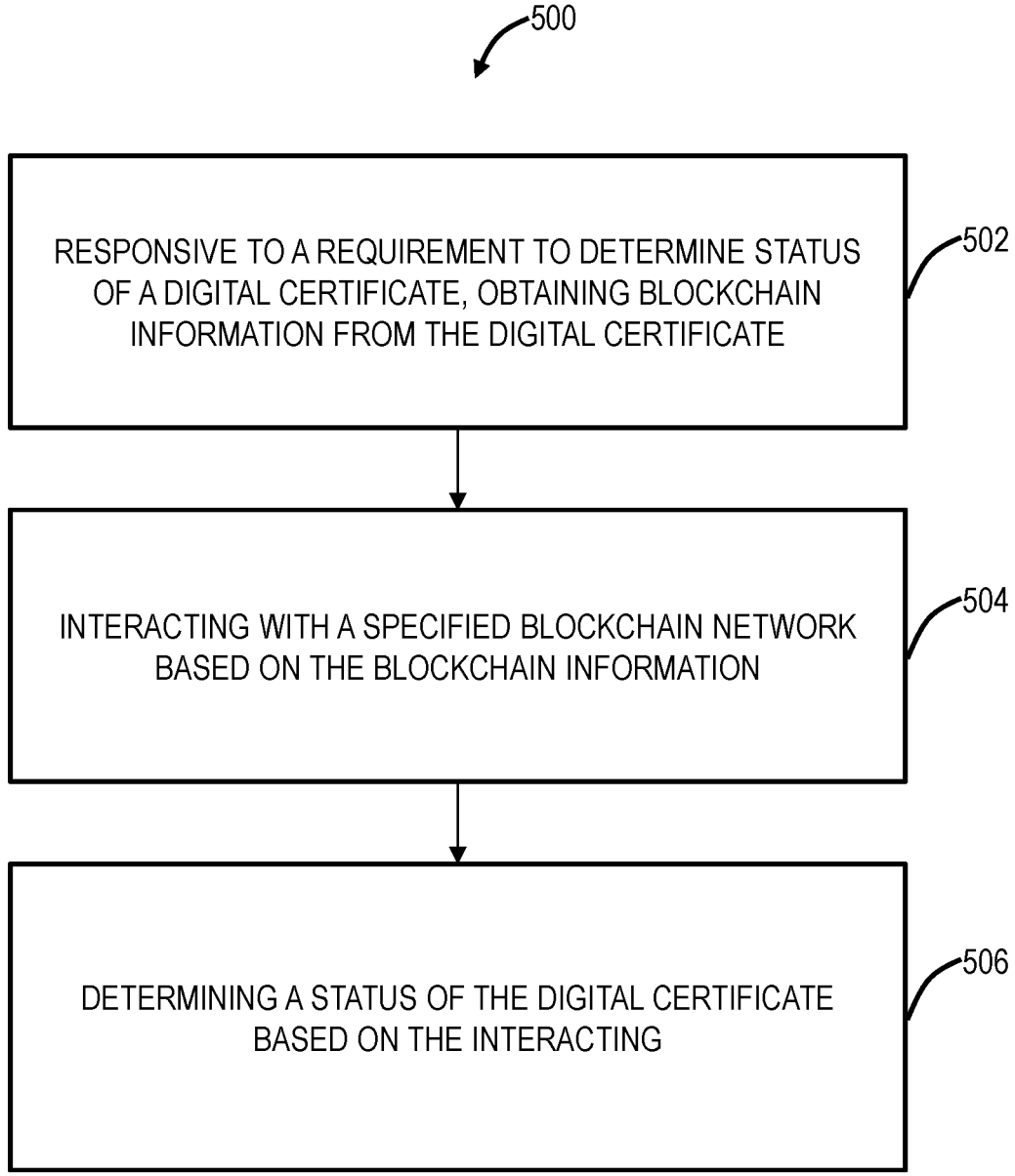
FIG. 5 is a flow chart of a process for blockchain-based certificate management.

FIG. 5 is a flow chart of a process 500 for blockchain-based certificate management. The process 500 includes responsive to a requirement to determine status of a digital certificate, obtaining blockchain information from the digital certificate (step 502); interacting with a specified blockchain network based on the blockchain information (step 504); and determining a status of the digital certificate based on the interacting (step 506).

The process 500 further includes wherein the blockchain information includes a Uniform Resource Identifier (URI) in an extension field of the digital certificate with the URI for the specified blockchain network. The URI in the extension field can be utilized in lieu of an Online Certificate Status Protocol (OSCP) URI. The blockchain information can include a smart contract address in the specified blockchain network. The blockchain information can include a method for requesting the digital certificate's status in the specified blockchain network. The status can be one of good, revoked, and unknown. The steps can further include, responsive to a Certificate Authority (CA) for the digital certificate revoking the digital certificate by adding a transaction to the specified blockchain network, determining the status of the digital certificate as revoked. Responsive to the status being revoked, the steps can include deleting the digital certificate. The steps can further include periodically querying the specified blockchain network for the digital certificate. The steps can include updating one or more additional IoT devices based on the status of the digital certificate, wherein the one or more additional IoT devices are connected to the IoT device and not connected to the Internet.

Conclusion

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:
responsive to a requirement to determine status of a digital certificate, obtaining blockchain information from the digital certificate;
interacting with a specified blockchain network based on the blockchain information; and
determining a status of the digital certificate based on the interacting with the specified blockchain network.

2. The method of claim 1, wherein the blockchain information includes a Uniform Resource Identifier (URI) in an extension field of the digital certificate with the URI for the specified blockchain network.

3. The method of claim 2, wherein the URI in the extension field is utilized in lieu of an Online Certificate Status Protocol (OSCP) Uniform Resource Locator (URL).

4. The method of claim 1, wherein the blockchain information includes a smart contract address in the specified blockchain network.

5. The method of claim 1, wherein the blockchain information includes a method for requesting the digital certificate's status in the specified blockchain network.

6. The method of claim 1, wherein the status of the digital certificate is one of good, revoked, and unknown.

7. The method of claim 1, wherein the steps further include:
responsive to a Certificate Authority (CA) for the digital certificate revoking the digital certificate by adding a transaction to the specified blockchain network, determining the status of the digital certificate as revoked.

8. The method of claim 1, wherein the steps are performed by a client device, and wherein the steps further include:
responsive to the status being revoked, deleting the digital certificate.

9. The method of claim 1, wherein the steps are performed by an Internet of Things (IoT) device, and wherein the steps further include:
periodically querying the specified blockchain network for the digital certificate based on any of a specified trigger and a preconfigured interval.

10. The method of claim 9, wherein the steps further include:
updating one or more additional IoT devices based on the status of the digital certificate, wherein the one or more additional IoT devices are connected to the IoT device and not connected to the Internet.

11. A non-transitory computer-readable medium comprising instructions that, when executed, cause one or more processors to perform steps of:
responsive to a requirement to determine status of a digital certificate, obtaining blockchain information from the digital certificate;
interacting with a specified blockchain network based on the blockchain information; and
determining a status of the digital certificate based on the interacting with the specified blockchain network.

12. The non-transitory computer-readable medium of claim 11, wherein the blockchain information includes a Uniform Resource Identifier (URI) in an extension field of the digital certificate with the URI for the specified blockchain network.

13. The non-transitory computer-readable medium of claim 12, wherein the URI in the extension field is utilized in lieu of an Online Certificate Status Protocol (OSCP) Uniform Resource Locator (URL).

14. The non-transitory computer-readable medium of claim 11, wherein the blockchain information includes a smart contract address in the specified blockchain network.

15. The non-transitory computer-readable medium of claim 11, wherein the blockchain information includes a method for requesting the digital certificate's status in the specified blockchain network.

16. The non-transitory computer-readable medium of claim 11, wherein the status of the digital certificate is one of good, revoked, and unknown.

17. The non-transitory computer-readable medium of claim 11, wherein the steps further include:
responsive to a Certificate Authority (CA) for the digital certificate revoking the digital certificate by adding a transaction to the specified blockchain network, determining the status of the digital certificate as revoked.

18. The non-transitory computer-readable medium of claim 11, wherein the one or more processors are in a client device, and wherein the steps further include:
responsive to the status being revoked, deleting the digital certificate.

19. The non-transitory computer-readable medium of claim 11, wherein the one or more processors are in an Internet of Things (IoT) device, and wherein the steps further include:
periodically querying the specified blockchain network for the digital certificate based on any of a specified trigger and a preconfigured interval.

20. The non-transitory computer-readable medium of claim 19, wherein the steps further include:
updating one or more additional IoT devices based on the status of the digital certificate, wherein the one or more additional IoT devices are connected to the IoT device and not connected to the Internet.

* * * * *